(12) United States Patent
Song (10) Patent No.: US 6,531,896 B1
(45) Date of Patent: Mar. 11, 2003

(54) DUAL MODE TRANSMITTER (75) Inventor: Hongjiang Song, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,738

(22) Filed: Dec. 28, 1999

(51) Int. Cl.[7] .......................................... H03K 19/0175
(52) U.S. Cl. ....................................................... 326/86
(58) Field of Search ........................ 326/82–92; 327/103, 327/104, 108; 307/412

(56) References Cited

U.S. PATENT DOCUMENTS

| 4,476,485 A | * | 10/1984 | Kalmanash | ................. 315/375 |
| 4,788,490 A | * | 11/1988 | Valaas | ........................ 324/703 |
| 5,485,488 A | | 1/1996 | Van Brunt et al. | |
| 5,715,409 A | | 2/1998 | Bucher et al. | |
| 5,914,608 A | * | 6/1999 | Wissman et al. | ............ 324/522 |
| 6,005,414 A | | 12/1999 | Reay | |
| 6,114,844 A | * | 9/2000 | Chang et al. | ................ 323/281 |
| 6,369,621 B1 | * | 4/2002 | Tinsley et al. | ............... 327/108 |

FOREIGN PATENT DOCUMENTS

| EP | 0 939 375 A2 | 9/1999 |
| WO | WO 00/45558 | 8/2000 |

* cited by examiner

Primary Examiner—Paul R. Myers
(74) Attorney, Agent, or Firm—Trop, Pruner & Hu, P.C.

(57) ABSTRACT

A method includes selecting either a current signaling mode or a voltage signaling mode to communicate with a serial bus. When the current signaling mode is selected, an output stage is placed in the current signaling mode, and when the voltage signaling mode is selected, the output stage is placed in the voltage signaling mode.

19 Claims, 6 Drawing Sheets

DUAL MODE TRANSMITTER

BACKGROUND

The invention generally relates to a dual mode transmitter, such as a transmitter for a serial bus, for example.

Figures 1, 2, 3:
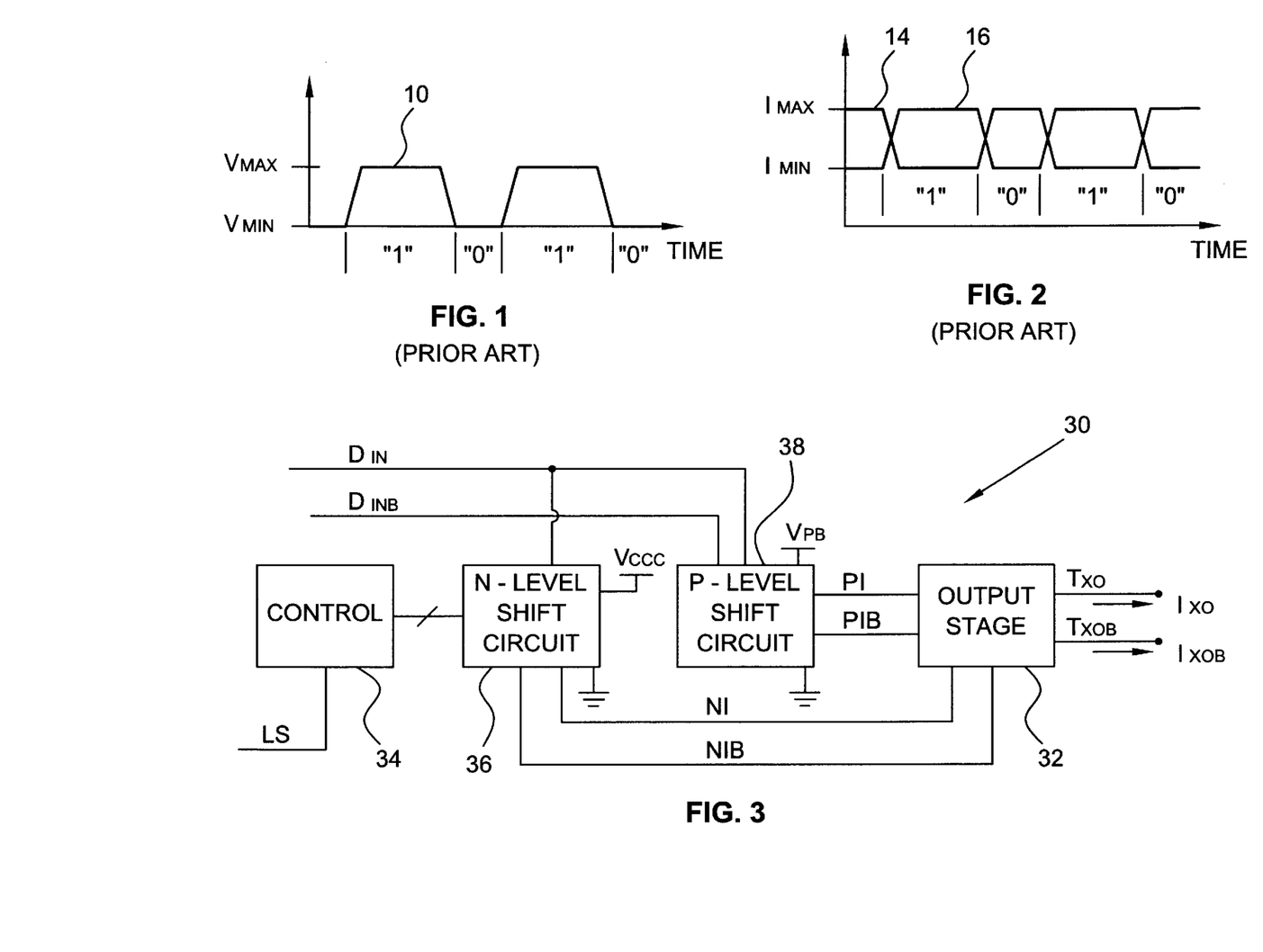
FIG. 1 illustrates a single-ended voltage signaling technique of the prior art.
FIG. 2 illustrates a differential current mode signaling technique of the prior art.
FIG. 3 is a schematic diagram of a transmitter according to an embodiment of the invention.

There are at least two signaling techniques that may be used to communicate bits of data over a serial bus. Referring to FIG. 1, one technique, called single-ended voltage mode signaling, uses changes in a voltage of a serial bus line to indicate bits of data. As an example of this type of signaling, a voltage signal 10 on the serial bus line may swing between a high voltage level (called $V_{MAX}$) to indicate a logic one bit and a lower voltage level (called $V_{MIN}$) to indicate a logic zero bit. Due to the simplicity of the circuitry that is associated with voltage mode signaling, this type of signaling typically is used for bit rates less than about 50 megabits/second (Mb/s).

For higher bit rates (bits rates greater than about 50 Mb/s), a signaling technique called differential current mode signaling may be used. Typically, differential current mode signaling is associated with better signal integrity, lower switching noise and lower power dissipation. Referring to FIG. 2, with differential current mode signaling, two current signals 14 and 16 (present on two different serial bus lines) vary between a maximum current level (called $I_{MAX}$) and a minimum current level (called $I_{MIN}$) to indicate data bits. In this manner, the current signals 14 and 16 indicate a logic one bit when the current signal 16 has an $I_{MAX}$ current level and the current signal 14 has an $I_{MIN}$ current level. The current signals 14 and 16 indicate a logic zero bit when the current signal 14 has an $I_{MAX}$ current level and the current signal 16 has an $I_{MIN}$ current level.

A serial bus device typically includes a transmitter and a receiver to communicate with each serial bus data line using, for example, the single-ended voltage mode or the differential current mode signaling technique. As examples, the Universal Serial Bus (USB) standard uses the single-ended voltage mode signaling technique, and the USB 2.0 standard uses the differential current mode signaling technique. The USB standard is described in the Universal Serial Bus Specification, Revision 1.0, published in January 1996. The USB 2.0 standard is described on the Internet at www.usb.org/developers/index.html. To accommodate the two different serial bus standards, the serial bus device may include two transmitters: one transmitter for single-ended voltage mode signaling and another transmitter for differential current mode signaling. Unfortunately, two transmitters (instead of one transmitter) for each serial bus data line may significantly increase the fabrication area of the serial bus device. Furthermore, the performance of high speed transmissions may be affected due to the extra capacitances that are present at an output port of the serial bus device due to the presence of the two transmitters.

Thus, there is a continuing need for an arrangement that addresses one or more of the problems that are stated above.

SUMMARY

In an embodiment of the invention, a method includes selecting either a current signaling mode or a voltage signaling mode to communicate with a serial bus. When the current signaling mode is selected, an output stage is placed in the current signaling mode, and when the voltage signaling mode is selected, the output stage is placed in the voltage signaling mode.

Advantages and other features of the invention will become apparent from the following description, from the drawing and from the claims.

DETAILED DESCRIPTION

Figure 4:
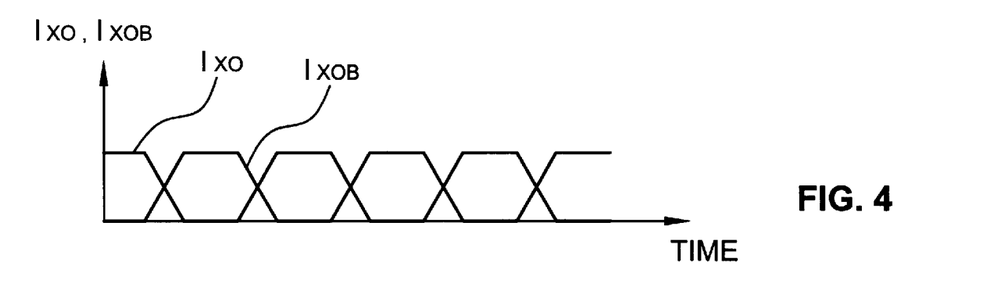
FIGS. 4, 5, 6, 7, 8, 9 and 10 are waveforms of the repeater of FIG. 3.

Referring to FIG. 3, an embodiment 30 of a dual mode serial bus transmitter in accordance with the invention has two modes: a current mode in which the transmitter 30 may communicate with a serial bus data line using differential current mode signaling and a voltage mode signaling mode in which the transmitter 30 may communicate with the serial bus data line using single-ended voltage mode signaling. To accomplish this, the transmitter 30 includes an output stage 32 that includes two output terminals 150 and 152. When the transmitter 30 is placed in the current mode, the output terminals 150 and 152 furnish current signals (called $I_{XO}$ and $I_{XOB}$ (see FIG. 4)) that differentially indicate bits of a digital signal. When the transmitter 30 is placed in the voltage mode, the output terminal 150 is coupled to ground, and the terminal 152 furnishes a voltage signal (called $T_{XO}$ (see FIG. 5)) that indicates bits of a digital signal.

Figure 7:
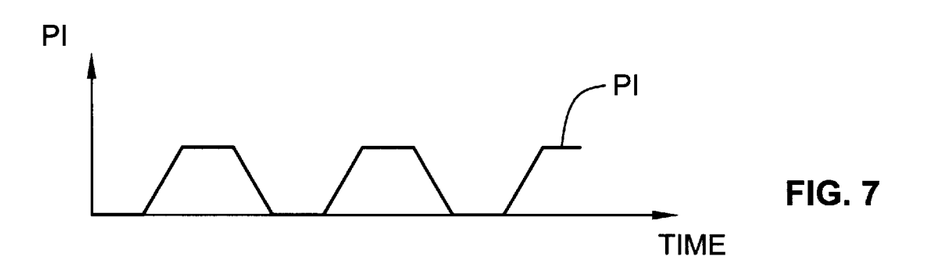
Figure 8:
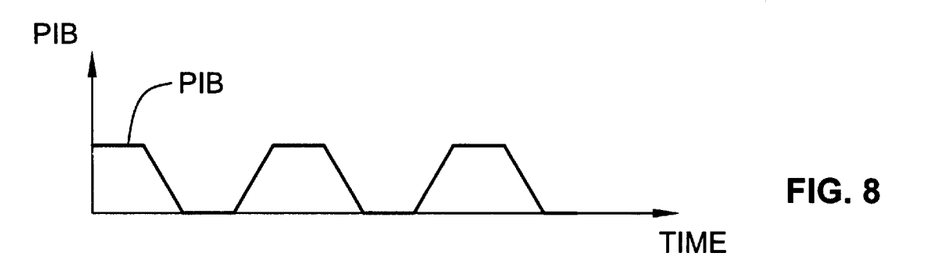

More particularly, in some embodiments, the transmitter 30 includes a control circuit 34 that, as described below, configures the output stage 32 to furnish either the $I_{XO}$ and $I_{XOB}$ current signals (in the current mode) or the $T_{XOB}$ voltage signal (in the voltage mode). Besides the control circuit 34 and the output stage 32, the transmitter 30 includes an N-level shift circuit 36 and a P-level shift circuit 38, circuits that receive signals (called $D_{IN}$ and $D_{INB}$) that differentially indicate the logic levels of bits that are to be communicated over the serial bus and generate signals to drive the output stage 32. In this manner, in response to the received $D_{IN}$ and $D_{INB}$ signals, the P-level shift circuit 38 generates signals called PI (see FIG. 7) and PIB (see FIG. 8). The P-level shift circuit 38 forms the PI signal by inverting and level shifting the $D_{IN}$ signal so that the PI signal has a bias voltage that is approximately between a supply voltage called $V_{PB}$ and ground. Similarly, the P-level shift circuit 38 forms the PIB signal by inverting and level shifting the $D_{INB}$ signal to form the same bias voltage as the PI signal. Due to this arrangement, the P-level shift circuit 38 contributes a voltage bias (to the PIB and PI signals) that is suitable to drive PMOSFETs of the output stage 32, as described below. As an example, the $V_{PB}$ voltage level may be approximately 3.3 volts. As described below, the PI and PIB signals are used to drive two matched p-channel metal-oxide-semiconductor field-effect-transistors (PMOSFETs) that are located on different sides of a differential amplifier that forms the output stage 32.

Figure 9:
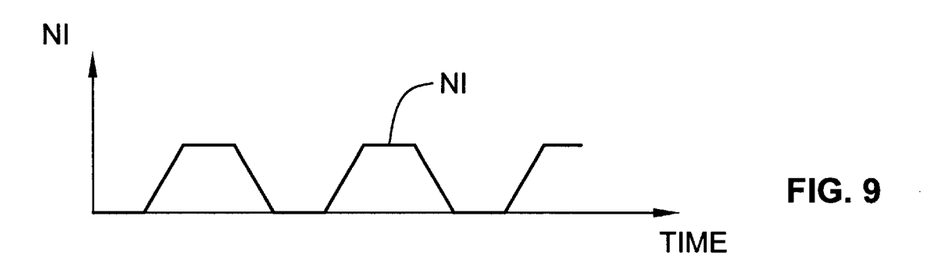
Figure 10:
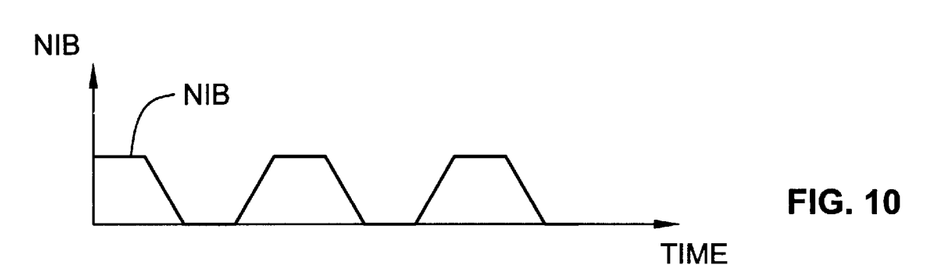

The N-level shift circuit 36 generates signals called NI and NIB. During the voltage mode, the N-level shift circuit 36 forms the NI signal (see FIG. 9) by inverting and level shifting the $D_{IN}$ signal so that the NI signal has a bias voltage that is approximately between a supply voltage (called $V_{ccc}$) and ground. Similarly, during the voltage mode, the N-level shift circuit 36 forms the NIB signal (see FIG. 10) by inverting and level shifting the $D_{INB}$ signal to form the same bias voltage as the NIB signal. As described below, the NI and NIB signals are used to drive two matched n-channel metal-oxide-semiconductor field-effect-transistors (nMOSFETs) that are located on different sides of the differential amplifier that forms the output stage 32. As an example, the $V_{ccc}$ voltage may be approximately 1.8 volts to establish a bias voltage of approximately 0.9 volts for each of the NM and NIB signals.

For the current mode, the NI and NIB signals are not inverted representations of the $D_{IN}$ and $D_{INB}$ signals. Instead, the control circuit 34 causes the N-level shift circuit 36 to assert the NM and NIB signals for the duration of the current mode, an action that configures the output stage 32 to be a differential current signaling transmitter, as described below.

Figure 11:
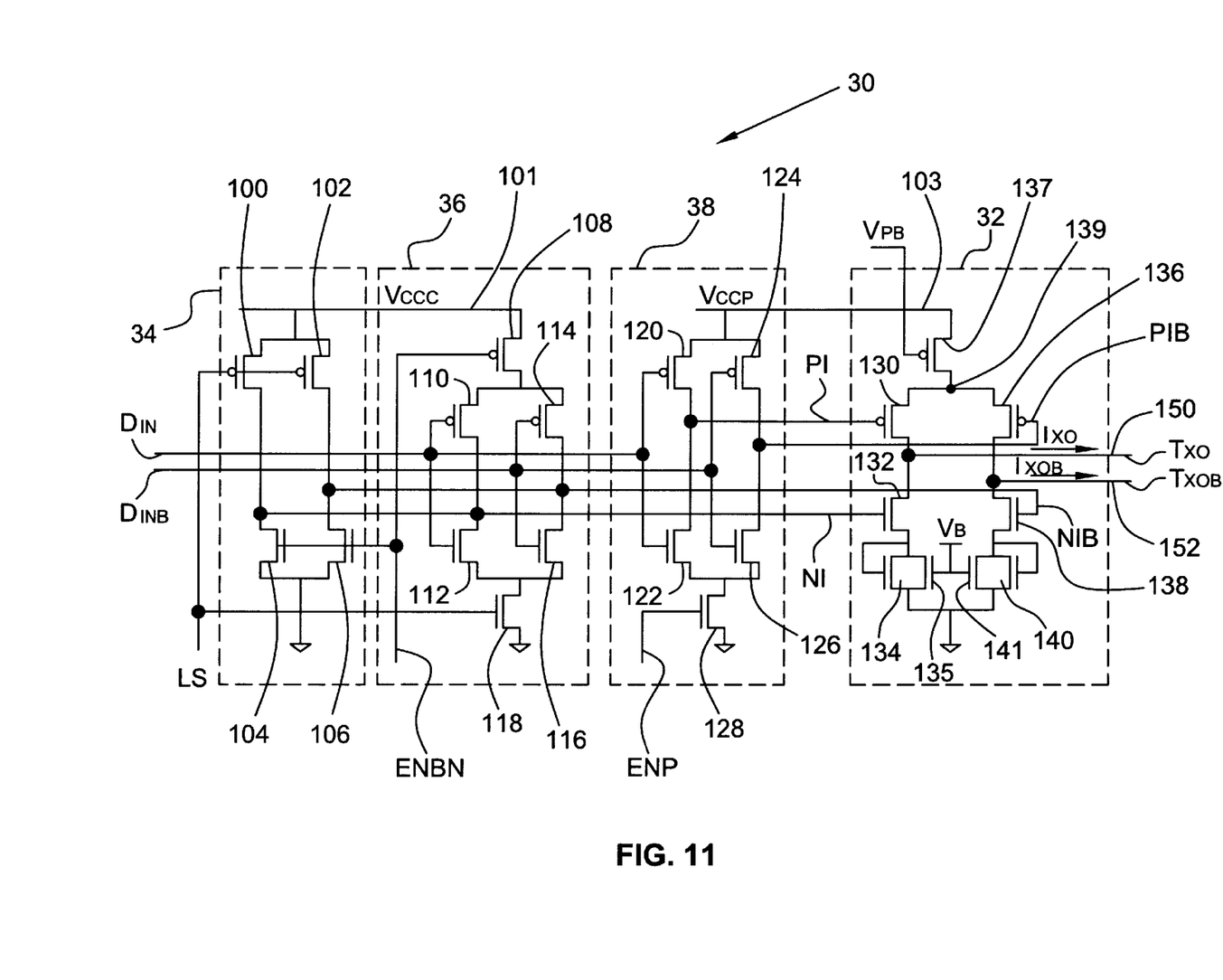
FIG. 11 is a more detailed schematic diagram of the transmitter of FIG. 3 according to an embodiment of the invention.

Referring to FIG. 11, the output stage 32 includes a differential amplifier that may function either as a transconductance amplifier (in the current mode) or a voltage amplifier (in the voltage mode). The output stage 32 includes a PMOSFET 137 that functions as a linear load to the differential amplifier in the voltage mode and as a nearly constant current source to the differential amplifier in the current mode. The source terminal of the PMOSFET 137 is coupled to a positive supply voltage (called $V_{ccp}$) and the drain terminal of the PMOSFET 137 is coupled to a node 139 that receives current from the drain terminal of the PMOSFET 137 and furnishes current to both sides of the differential amplifier.

One side of the differential amplifier includes a PMOSFET 130 that receives the PI signal at its gate terminal and an NMOSFET 132 that receives the NM signal at its gate terminal. The source terminal of the PMOSFET 130 is coupled to the node 139, and the drain terminal of the PMOSFET 130 is coupled to the drain terminal of the NMOSFET 132. The source terminal of the NMOSFET 132 is coupled to an active load that may be formed by, for example, two NMOSFETS 134 and 135 that have their drain-source paths coupled in parallel between the source terminal of the NMOSFET 132 and a negative supply voltage (called $V_{ss}$). The gate and drain terminals of the NMOSFET 134 are coupled together, and the gate terminal of the NMOSFET 135 receives a bias voltage called $V_B$.

The other side of the differential amplifier includes a PMOSFET 136 and an NMOSFET 138 that, in some embodiments, have the same aspect ratios as the PMOSFET 130 and the NMOSFET 132, respectively. The PMOSFET 136 receives the PIB signal at its gate terminal, and the NMOSFET 138 that receives the NIB signal at its gate terminal. The source terminal of the PMOSFET 136 is coupled to the node 139, and the drain terminal of the PMOSFET 136 is coupled to the drain terminal of the NMOSFET 138. The source terminal of the NMOSFET 138 is coupled to an active load that may be formed by, for example, two NMOSFETS 140 and 141 that have their drain-source paths coupled in parallel between the source terminal of the NMOSFET 138 and a negative supply voltage (called $V_{ss}$). The gate and drain terminals of the NMOSFET 140 are coupled together, and the gate terminal of the NMOSFET 141 receives the VB bias voltage. The output terminals 150 and 152 are formed by the drain terminals of the PMOSFETs 130 and 136, respectively.

Figure 5:
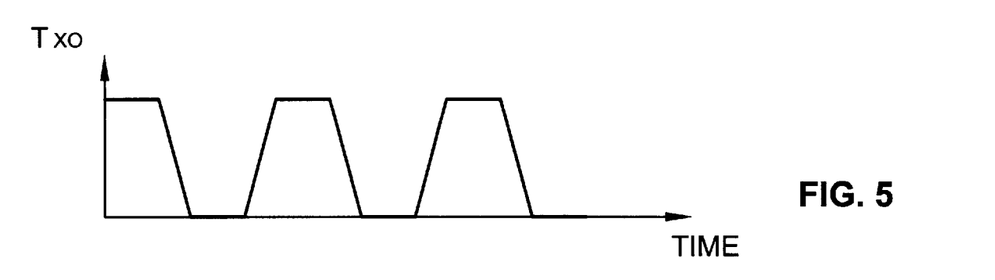
Figure 6:
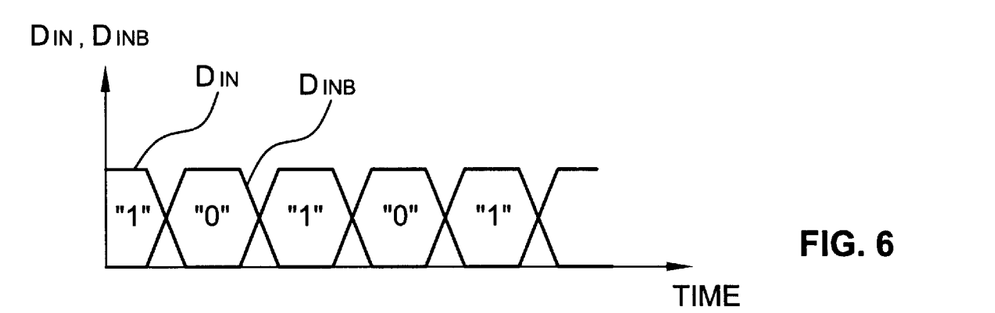
Figure 12:
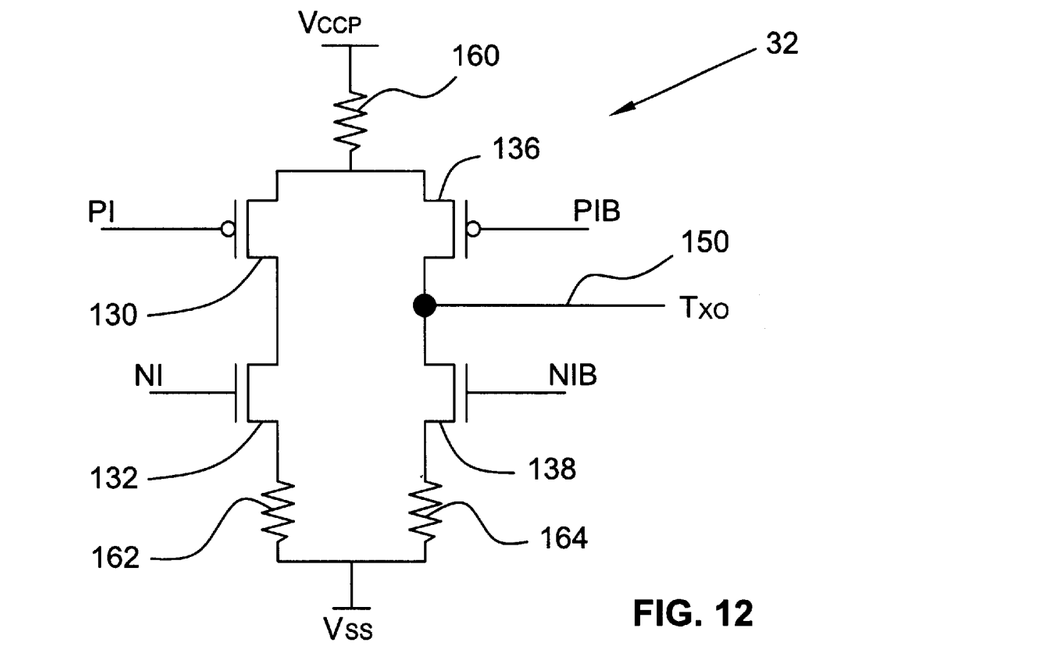
FIG. 12 is a schematic diagram of an output stage of the transmitter when the transmitter is operating in a voltage signaling mode according to an embodiment of the invention.

Referring to FIG. 12, in the voltage mode, the output stage 32 operates in the following manner. Due to the gate-to-source voltage of the PMOSFET 137 (see FIG. 11) during the voltage mode, the PMOSFET 137 operates in its linearly resistive region and effectively functions as a resistor 160 (see FIG. 12). The active load that is formed by the NMOSFETs 134 and 135 may also be represented by a resistor 162, and the active load that is formed by the NMOSFETs 134 and 135 may be represented by a resistor 164. Thus, due to this arrangement, the output terminal 150 furnishes the Txo voltage that swings between approximately the $V_{ccp}$ and $V_{ss}$ voltage levels to indicate logic one and logic zero bits, respectively, as depicted in FIG. 5.

During the current mode, the NI and NIB signals are logic one signals that cause the NMOSFETs 132 and 138 to operate in their linearly resistive regions, i.e., regions in which the drain-to-source voltages of the NMOSFETs 132 and 138 are approximately zero volts. Thus, referring to FIG. 13, during the current mode, the NMOSFETS 132 may be effectively represented by conductive shorts so that the drain terminals of the PMOSFETs 130 and 136 are effectively coupled to the resistors 162 and 164 that represent the NMOSFET active loads. Because the NMOSFETs 132 and 138 are placed in their linearly resistive regions during the current mode, the drain terminal of the PMOSFET 137 (see FIG. 11) has a voltage that is lower than the voltage of the drain terminal during the voltage mode. Due to this lower voltage, the PMOSFET 137 does not operate in its linearly resistive region in the current mode, but instead, the PMOSFET 137 operates in its saturation region during the current mode. As a result of this configuration, the PMOSFET 137 is effectively a nearly constant current source 170 (see FIG. 170) during the current mode.

Figure 13:
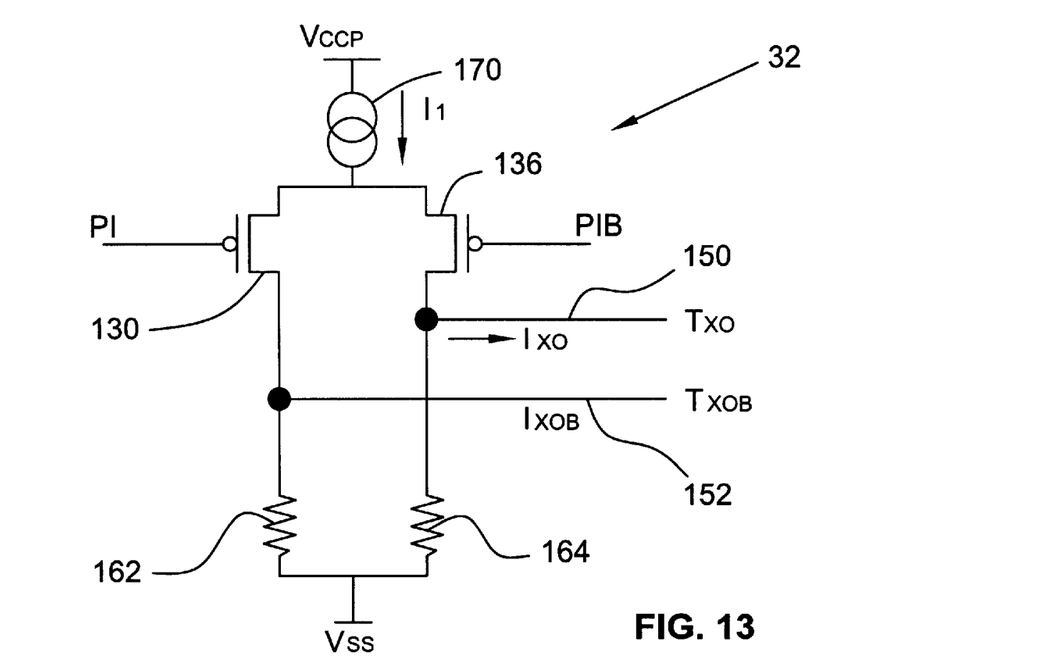
FIG. 13 is a schematic diagram illustrating operation of the output stage of the transmitter when the transmitter is operating in a differential current signaling mode.

In this manner, the current source 170 furnishes a nearly constant current (called 11) that is routed to either the output terminal 150 (to pulse high the $I_{XO}$ current signal) or the output terminal 152 (to pulse high the $I_{XOB}$ current signal), in response to the PI and PIB signals. The PI and PIB signals are complementary with respect to each other, so that one of the two $I_{XO}$ and $I_{XOB}$ signals is always pulsed high with respect to the other signal to form the differential current signaling.

Among the other features of the transmitter 30, the P-level shift circuit 36 may include a complimentary metal-oxide-semiconductor (CMOS) inverter that is formed from a PMOSFET 110 and an NMOSFET 112. In this manner, the gate terminals of the PMOSFET 110 and the NMOSFET 112 receive the DIN signal, and the drain terminals of the PMOSFET 110 and the NMOSFET 112 furnish the NI signal. The P-level shift circuit 36 also includes another CMOS inverter that is formed from a PMOSFET 114 and an NMOSFET 116. The gate terminals of the PMOSFET 114 and the NMOSFET 116 receive the $D_{INB}$ signal, and the drain terminals of the NMOSFET 116 and the PMOSFET 114 furnish the NIB signal. The above-described CMOS inverters are selectively enabled via an NMOSFET 118 and a PMOSFET 108. In this manner, the drain-source path of the NMOSFET 118 is coupled between the source terminals of the NMOSFETS 112 and 116 and ground.

The source-drain path of the PMOSFET 108 is coupled between a voltage supply line 101 (that furnishes the $V_{ccc}$ supply voltage) and the source terminals of the PMOSFETs 110 and 114. The P-level shift circuit 38 is enabled when the transmitter 30 power up by the assertion of an ENBN signal (received by the gate terminal of the PMOSFET 108) and an LS signal is received by the gate terminal of the NMOSFET 118. The ENBN signal is asserted after power up of the transmitter 30, and the LS signal is used to control the mode of the transmitter, as further described below. The N-level shift circuit 38 includes a CMOS inverter that is formed from a PMOSFET 120 and an NMOSFET 122 that receive the $D_{IN}$ signal at there gate terminals. The drain terminals of the PMOSFET 120 and NMOSFET 122 furnish the PI signal. The N-level shift circuit 38 also includes a CMOS inverter formed from a PMOSFET 124 and an NMOSFET 126 that receive the $D_{INB}$ signal at their gate terminals. The drain terminals of the PMOSFET 124 and the NMOSFET 126 furnish the PIB signal. The CMOS inverter of the N-level shift circuit 36 are enabled via an NMOSFET 128 that has its drain-source path coupled between the source terminals of the NMOSFETs 122 and 126 in ground. The gate terminal of the NMOSFET 128 receives an ENP signal that is asserted after power up to enable the P-level shift circuit 38.

The mode of the transmitter 30 is controlled via the LS signal. In this manner, when the LS signal is de-asserted, the N-level shift circuit 36 is disabled and the control circuit 34 pulls the NI and NIB signals high to place the output stage 32 in the voltage signaling transmission mode. To accomplish this, the control circuit 34 includes an NMOSFET 104 that has its drain-source path coupled in series with the source-drain path of a PMOSFET 100. The source terminal of the NMOSFET 104 is coupled to ground, and the source terminal of the PMOSFET 100 is coupled to the $V_{ccc}$ voltage supply line 101. The drain terminal of the NMOSFET 104 is coupled to the drain terminal of the NMOSFET 112. The control circuit 34 also includes an NMOSFET 106 that has its drain-source path coupled in series with the source-drain path of a PMOSFET 102. The source terminal of the PMOSFET 102 is coupled to the $V_{ccc}$ voltage supply line 101, and the source terminal of the NMOSFET 106 is coupled to ground.

The gate terminals of the NMOSFETs 104 and 106 receive the ENBN signal, and the gate terminals of the PMOSFETs 100 and 102 receive the LS signal. Due to this arrangement, during the voltage signaling mode, the LS and ENBN signals are high, an arrangement that turns off all of the transistors of the control circuit 34. However, when the LS signal is driven high and the ENBN signal is low (indicating that the transmitter 30 is powered up) the PMOSFETs 100 and 102 pull the drain terminals of the NMOSFETs 112 and 116 high, an event that pulls the NI and NIB signals high and places the output stage 32 in the current mode. It is noted that before power up of the transmitter 30, the ENBN signal is at a logic one level and thus causes the NI and NIB signals to be pulled near a ground level to disable the output stage 32.

Figure 14:
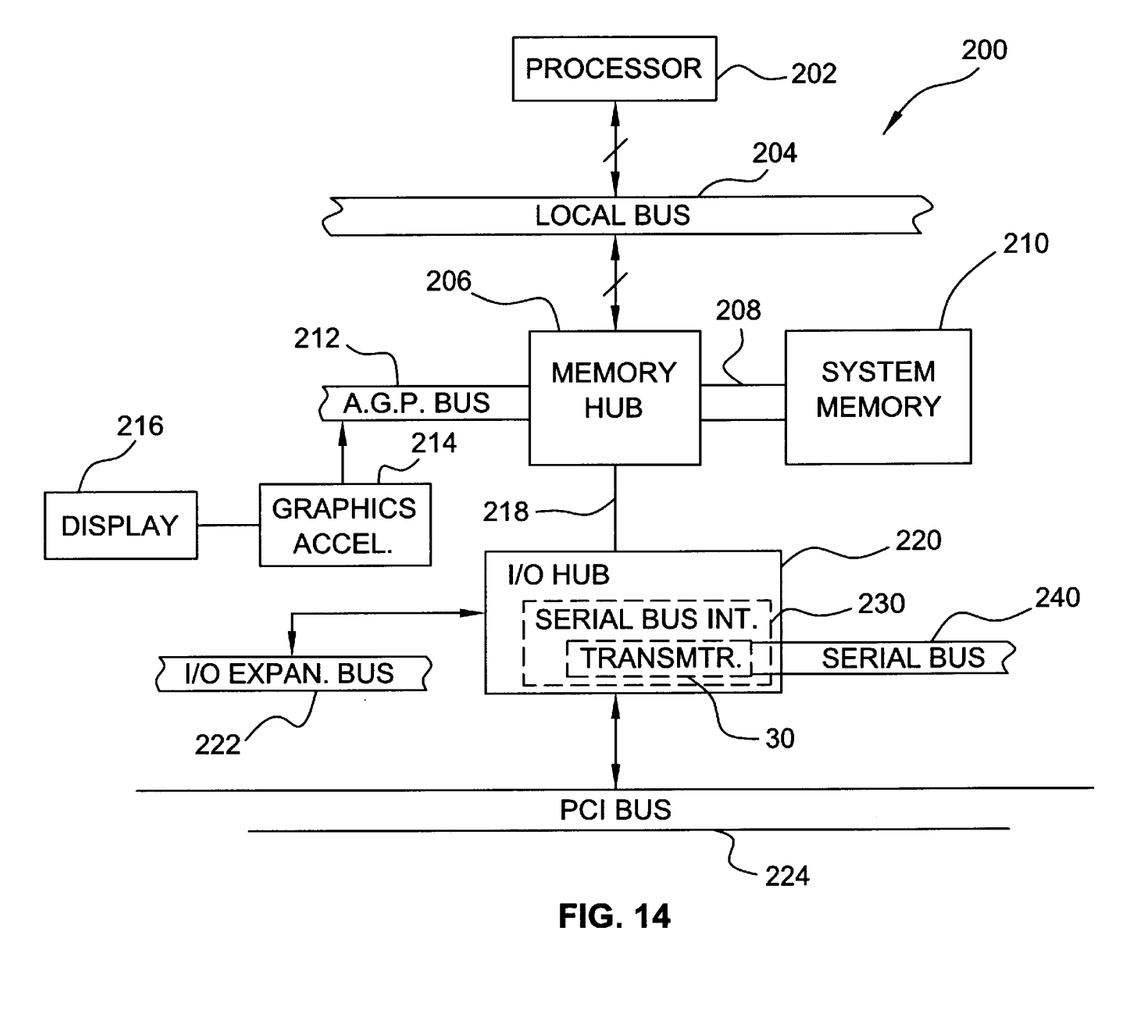
FIG. 14 is a schematic diagram of a computer system according to an embodiment of the invention.

In some embodiments, the transmitter 30 may be part of a computer system 200. In this manner, the computer system 200 may include a processor 202 (a microprocessor, for example) that is coupled to a local bus 204. Also coupled to the local bus 204 is a north bridge, or memory hub 206, that interfaces the local bus 204 to a memory bus 208 that is coupled to a system memory 210. The memory hub 206 also provides interfaces, for example, to an Accelerated Graphics Port (AGP) bus 212 and a hub link 218. A graphics accelerator 214 is coupled to the AGP bus 212 and may drive a display 216. The AGP is described in detail in the Accelerated Graphics Port Interface Specification, Revision 1.0, published on Jul. 31, 1996, by Intel Corporation of Santa Clara, Calif.

The hub link 218 establishes communication between the memory hub 206 and an input/output (I/O) hub 220 that functions as a south bridge. In this manner, the I/O hub 220 may provide an interface to an I/O expansion bus 222 and a Peripheral Component Interconnect (PCI) bus 224. The PCI Specification is available from The PCI Special Interest Group, Portland, Oreg. 97214. The I/O hub 220 also includes a serial bus interface 230 to establish communication with a serial bus 240. In this manner, the serial interface 230 includes one or more transmitters 30 to communicate with various lines of the serial bus 240. Thus, the processor 202 may communicate data via the serial bus 240 by using the serial bus interface 230.

Other embodiments are within scope of the following claims. For example, the two CMOS inverters of the N-level 36 and P-level 38 shift circuits may be coupled to each other to form latches. In this manner, the drain terminals of the NMOSFET 116 and the PMOSFET 114 may be coupled to the gate terminals of the NMOSFET 112 and the PMOSFET 110. Similarly, the drain terminals of the NMOSFET 126 and the PMOSFET 124 may be coupled to the gate terminals of the NMOSFET 122 and the PMOSFET 120. Other arrangements are possible.

While the invention has been disclosed with respect to a limited number of embodiments, those skilled in the art, having the benefit of this disclosure, will-appreciate numerous modifications and variations therefrom. It is intended that the appended claims cover all such modifications and variations as fall within the true spirit and scope of the invention.

What is claimed is:

1. A serial bus transmitter comprising:
   an output stage;
   a circuit coupled to the output stage to place the output stage in either a current signaling transmission mode or a voltage signaling transmission mode, the output stage comprising a first stage to furnish a near constant current in the current signaling transmission mode and establish a resistive load in the voltage signaling transmission mode; and
   a complementary switching stage coupled to the first stage to use the near constant current in the current signaling transmission mode to generate a current signal indicative of bits of a digital signal and use the resistive load in the voltage signaling transmission mode to generate a voltage signal indicative of the bits.

2. The serial bus transmitter of claim 1, wherein the output stage furnishes an output signal indicative of bits of a digital signal, and the output signal comprises a current signal when the output stage is in the current signaling transmission mode.

3. The serial bus transmitter of claim 2, wherein the current signal includes two different current levels indicative of different logical states.

4. The serial bus transmitter of claim 2, wherein the output signal comprises a voltage signal when output stage is in the voltage signaling transmission mode.

5. The serial bus transmitter of claim 4, wherein the voltage signal includes two different voltage levels indicative of different logical states.

6. The serial bus transmitter of claim 1, wherein the complementary switching circuit comprises:
   a first transistor to, in the current signaling transmission mode, furnish said near constant current to a first output terminal of the output stage in response to a logical bit state; and a second transistor to, in the current signaling transmission mode, furnish said near constant current to a second output terminal of the output stage in response to another different logical bit state.

7. The serial bus transmitter of claim 1, wherein the complementary switching circuit comprises:

complementarily arranged transistors coupled to each other to generate, in the voltage signaling transmission mode, a voltage signal indicative of the bits at an output terminal of the output signal.

8. The serial bus transmitter of claim 1, further comprising:

a level shifter to receive a first signal indicative of bits of a digital signal and generate a second signal indicative of a second signal to drive the output stage, the second signal having a different bias voltage component than the first signal.

9. A computer system comprising:

a serial bus;

a processor to process data communicated via the serial bus; and a serial bus interface coupled to the serial bus and the processor, the serial bus interface including an output stage to, in a first mode of the output stage, use current signaling to communicate with the serial bus and, in a second mode of the output stage, use voltage signaling to communicate with the serial bus, the output stage comprising:

a first stage to furnish a near constant current in the current signaling transmission mode and establish a resistive load in the voltage signaling transmission mode; and a complementary switching stage coupled to the first stage to use the near constant current in the current signaling mode to generate a current signal indicative of bits of a digital signal and use the resistive load in the voltage signaling transmission mode to generate a voltage signal indicative of the bits.

10. The computer system of claim 9, wherein the communication with the serial bus comprises a transmission of at least one signal indicative of the data.

11. The computer system of claim 9, wherein the output stage furnishes an output signal indicative of bits of a digital signal, and the output signal comprises a current signal when output stage is in the current signaling transmission mode.

12. The computer system of claim 11, wherein the current signal includes two different current levels indicative of different logical states.

13. The computer system of claim 9, wherein the output signal comprises a voltage signal when the output stage is in the voltage signaling transmission mode.

14. The computer system of claim 13, wherein the voltage signal includes two different voltage levels indicative of two different logical states.

15. The computer system of claim 9 wherein the complementary switching circuit comprises:

a first transistor to, in the current signaling transmission mode, furnish said near constant current to a first output terminal of the output stage in response to one logical bit state; and a second transistor to, in the current signaling transmission mode, furnish said near constant current to a second output terminal of the output stage in response to another logical bit stage different from said one logical bit state.

16. The computer system of claim 9, wherein the complementary switching circuit comprises:

complementarily arranged transistors coupled to each other to generate, in the voltage signaling transmission mode, a voltage signal indicative of the bits of an output terminal of the output signal.

17. A method comprising:

selecting either a current signaling mode or a voltage signaling mode to communicate with a serial bus;

in response to the current signaling mode being selected, causing a circuit of the output stage to behave as a current source and coupling an amplifier to the circuit to produce a current signal on the serial bus; and in response to the voltage signaling mode being selected, causing the circuit to behave as a resistive load and coupling the circuit to the amplifier to produce a voltage signal on the serial bus.

18. The method of claim 17, further comprising:

in response to entering the current signaling mode, disabling the current from behaving as the resistive load.

19. The method of claim 17, further comprising:

in response to entering the voltage signaling mode, disabling the circuit from behaving as the current source.

\* \* \* \* \*